US012046797B2

(12) United States Patent
Dardenne et al.

(10) Patent No.: US 12,046,797 B2
(45) Date of Patent: Jul. 23, 2024

(54) VEHICLE ANTENNA GLAZING

(71) Applicant: AGC GLASS EUROPE, Louvain-la-Neuve (BE)

(72) Inventors: Xavier Dardenne, Grez-Doice (BE); Ha Bui-Van, Louvain-la-neuve (BE); Dan Lis, Isnes (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 17/257,411

(22) PCT Filed: Jun. 28, 2019

(86) PCT No.: PCT/EP2019/067413
§ 371 (c)(1),
(2) Date: Dec. 31, 2020

(87) PCT Pub. No.: WO2020/007746
PCT Pub. Date: Jan. 9, 2020

(65) Prior Publication Data

US 2021/0184333 A1 Jun. 17, 2021

(30) Foreign Application Priority Data

Jul. 2, 2018 (EP) .................................... 18181303
Dec. 7, 2018 (EP) .................................... 18210930

(51) Int. Cl.
*H01Q 1/12* (2006.01)
*H01Q 9/32* (2006.01)
*H01Q 9/42* (2006.01)
*H01Q 13/10* (2006.01)
*H01Q 19/26* (2006.01)
*H01Q 21/12* (2006.01)

(52) U.S. Cl.
CPC ............ *H01Q 1/1271* (2013.01); *H01Q 9/32* (2013.01); *H01Q 9/42* (2013.01); *H01Q 13/106* (2013.01); *H01Q 19/26* (2013.01); *H01Q 21/12* (2013.01)

(58) Field of Classification Search
CPC ........ H01Q 1/1271; H01Q 9/32; H01Q 19/26; H01Q 21/12
See application file for complete search history.

(56) References Cited

U.S. PATENT DOCUMENTS 7,233,296 B2 6/2007 Song et al.
7,586,451 B2 * 9/2009 Lee ........................ H01Q 19/22 343/700 MS (Continued)

FOREIGN PATENT DOCUMENTS

EP 2 200 123 A1 6/2010
EP 3 089 272 A1 11/2016

(Continued)

OTHER PUBLICATIONS

International Search Report issued on Jul. 29, 2019 in PCT/EP2019/067413 filed on Jun. 28, 2019.

*Primary Examiner* — Daniel Munoz
(74) *Attorney, Agent, or Firm* — Oblon, McClelland, Maier & Neustadt, L.L.P.

(57) ABSTRACT

A vehicle antenna glazing comprising an antenna element that is a WIFI antenna working at 2.41-2.48 GHz frequencies and further comprises a planar radiating element connected to a co-axial connector.

13 Claims, 3 Drawing Sheets

(56) References Cited

U.S. PATENT DOCUMENTS

Figure 1A:
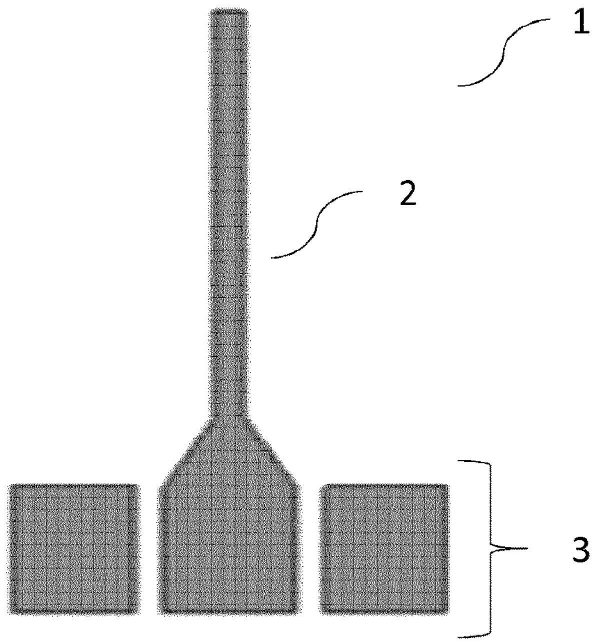

2017/0324138 A1 11/2017 Talty et al.
2018/0138575 A1 5/2018 Sarkis et al.
2019/0319334 A1* 10/2019 Dai ...................... H01Q 1/1271

FOREIGN PATENT DOCUMENTS

WO WO-2006107018 A1 * 10/2006 ........... H01Q 1/1271
WO WO 2010/029304 A1 3/2010

* cited by examiner

VEHICLE ANTENNA GLAZING

The present invention relates to a WiFi antenna integrated into a vehicle glazing and more particularly into a vehicle's windshield for OTA (Over the Air) communication between the vehicle and an infrastructure, such as the residential gateway at the driver's home. For instance, when the car is parked in proximity to the driver's home, automatic software updates could be sent to the car through the WiFi access point located in the home.

As the orientation of the car with respect to the home gateway is unpredictable, the antenna radiation pattern should be as uniform as possible over the 360° of azimuth.

Also, being integrated into a glazing and more particularly into a windshield, the antenna should be either hidden along the border of the glazing and more particularly of the windshield, hidden behind the central bracket, or made invisible or barely visible as to minimize intrusion into the driver's field of view.

Two main types of solution exists for WiFi communications outside of the vehicle.

The first one is based on antennas located inside the vehicle, typically behind the dashboard, which are already used for WiFi LAN (Local Area Network) inside the vehicle. Hence, the same antennas are used for inside, and outside WiFi coverage. The main problem of this approach is that, while the coverage inside the vehicle can be excellent, the outside coverage is very poor, mainly due to the antenna location. There are indeed many metallic parts between the antennas and the outside medium, in all directions.

The second option consists in using external antennas, typically located inside the bumpers or the side mirrors. The drawback of this approach is again a masking effect of the car body. For instance, an antenna located in the from bumper will radiate correctly towards the front of the car, but radiation towards the back is completely blocked by the metallic car body, and is therefore very poor. Installing an antenna into a side mirror provides good front and back radiation, but is very asymmetric along the left-right axis, again because of the masking effect of the car body. For instance, an antenna located in the right side mirror will have very poor radiation level on the left side of the car. This is illustrated in FIG. 1. To overcome this issue, OEMs typically resort to two antennas. For instance, one in each side mirror. This is indeed a good technical solution, but is very expensive, as there are two antennas instead of one, and their signals must be combined with additional electronic components (mixers, etc. . . . ). Therefore, although this solution would be acceptable for expensive premium cars, it is not the case for lower or middle class vehicles, for which a single antenna system is much simpler, cheaper, and therefore preferable.

Thus, the present invention proposes an easy solution consisting in embedding the WiFi antenna into the vehicle's glazing. Although this solution could technically be implemented in any of the vehicle glazing, the antenna should preferably be located in the windshield, as the WiFi transceiver is usually located behind the dashboard. The cabling length between the antenna structure and this transceiver is therefore reduced, which limits RF losses as well as cost.

Placing the antenna in a glazing and more particularly in the windshield ensures optimal coverage at the front of the vehicle, and also limits the masking effect towards the back. Depending on how the antenna radiation pattern is shaped, the proposed solution can then offer similar or better performance than the two-antenna solutions in the side mirrors, either towards the front or back direction, while keeping an acceptable level of performance in the opposite direction. In the direction with the weakest radiation, it is better than a dashboard antenna, although usually not as good as the side mirrors solution, but at a much lower price. The windshield integrated antenna can then be designed to maximize radiation in the desired direction. In prior art windshield integrated an antenna element, the radiation is slightly lower towards front and back, compared to an antenna integrated into the known side mirrors enclosure. However, it is much more uniform over 360° azimuth, and much better towards the side of the car opposite to the side mirror containing the antenna.

Thus, the present invention concerns a vehicle antenna glazing comprising an antenna element.

According to the present invention, the antenna element is a WIFI antenna working at a 2.41-2.48 GHz frequencies, the antenna element comprising a planar radiating element connected to a co-axial connector.

According to the present invention, the antenna element comprises further a planar feeding structure.

According to the present invention, the planar radiating element may be made of planar conducting material.

In a preferred embodiment of the present invention, the vehicle glazing is a laminated glazing. In a more preferred embodiment, the vehicle glazing is a windshield. The planar radiating element may be provided either at the face 2, also called P2 ie the inner face of the outer glass pane of the windshield, at the face 3 (P3) ie the inner face of the inner glass pane of the windshield or face 4 (P4) ie the outer face the inner glass of the windshield.

According to the present invention, the glazing can be a flat or curved panel to fit with the design of the car. The pane of glass can be tempered or laminated to respect with the specifications of security. A heatable system, for example a coating or a network of wires or silver print on a pane of glass, can be applied on the pane of glass to add a defrosting function for example. Also, the pane of glass can be a clear glass or a colored glass, tinted with a specific composition of the glass or by applying a coating or a plastic layer for example.

According to an embodiment of the present invention, the planar radiating element material can be a thin metal-based coating, a silver print, or a fine mesh of thin conducting wires (behaving as a fully conducting surface, if the mesh is fine compared to the wavelength).

The dimensions of the radiating element are chosen such that it radiates efficiently at the WiFi frequencies. Preferably in a single band (2.4 GHz band: 2.41-2.48 GHz), but it could as well be a wide band or multi-band element (covering the 2.4 GHz band and all or part of the 5 GHz band: 5.1-5.8 GHz).

The shape and dimensions of the radiating element are chosen so as to optimize the radiation pattern, i.e. maximize the coverage outside of the vehicle, and maximize radiation uniformity in azimuth around the vehicle.

The radiating element can also potentially include at least one parasitic element, whose purpose is to shape the radiation pattern according to requirements.

The radiating element can also potentially include at least one slot that is etched in the conducting material. The slot shape can be any usual shape used in slot antennas, that is compatible with the manufacturing process (rectangular, circular, H, U, . . . )

According the present invention, the antenna element comprises further a planar feeding structure. The planar feeding structure can be used to transport efficiently the radio frequency (RF) signal from the connector to the radiating element, in case the connector cannot be directly connected to the radiating element. The feeding structure can be any RF transmission line, such as a microstrip line or a coplanar waveguide. The feeding structure can also comprise optional impedance transformers or phase shifting structures.

The feeding structure can be located in the same face of the glazing structure as the radiating element, or in another face. When feeding structure is provided in another face than the radiating element, there is no electrical contact between the feeding structure and the radiating element. The radiating element is then fed by electromagnetic coupling.

According to the present invention, the antenna element is connected to a coaxial cable connector, more particularly a coaxial connector, is used to make the transition from the coaxial output of the transceiver to the radiating element, or its feeding structure. This connector should comply with the typical mechanical requirements for automotive glazing antennas (traction resistance, etc. . . . ). The coaxial cable allow to connect the antenna element to a power system. The coaxial cable may be further connected to a flat connector that can be laminated.

Being located in the windshield, the antenna should not interfere with the driver's vision.

The antenna system should then be located preferably along the edges of the windshield, typically hidden behind the internal plastic covers along the A-pillars or the central bracket, such as it is invisible, or mostly invisible from the inside.

Also, it should preferably be located behind the black ceramic, classically used to mask anesthetic elements, such as it is invisible, or mostly invisible from the outside.

The antenna system or a part of the antenna system could be located elsewhere, provided that it remains invisible or mostly invisible. For example, the antenna element is made of transparent, or almost transparent material (coating, fine mesh of very thin embedded wires, . . . ).

Other advantages, as well as appropriate achievements and developments of the invention are developed in the claims and in the description of embodiments with reference to the figures which show:

FIG. 1 to FIG. 5 are an examples of implementing particular embodiments of the present invention.

For avoidance of doubt, the terms "external" and "internal" refer to the orientation of the glazing during installation as glazing in a vehicle.

Also for avoidance of doubt, the present invention is applicable for all means of transport such as automotive, train, plane . . . .

For simplicity, the numbering of the glass sheets in the following description refers to the numbering nomenclature conventionally used for glazing. Thus, the face of the glazing in contact with the environment outside the vehicle is known as the side 1 and the surface in contact with the internal medium, that is to say the passenger compartment, is called face 2. For a laminated glazing, the glass sheet in contact with the outside environment the vehicle is known as the side 1 and the surface in contact with the internal part, namely the passenger compartment, is called face 4.

Figure 1B:
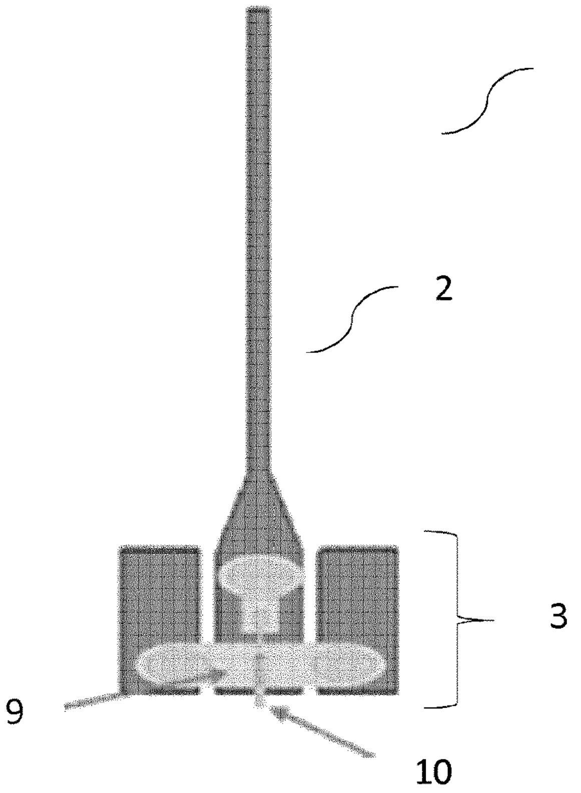

FIGS. 1*a* and 1*b* represent an embodiment of the present invention. The antenna element 1 is a single band, coplanar waveguide (CPW) fed 3, planar monopole. The radiating element 2 is made of for example a thin monopole (can be metal deposition or thin wire). The feeding structure 3 is the CPW structure.

The antenna element 1 may be implemented in a laminated glazing, more particularly a windshield. The glazing may comprise two glass sheets for example 2.1 mm thick for the external glass sheet and 1.6 mm thick for the internal glass sheet and joined by means of a thermoplastic sheet of 0.76 mm made of, for example, polyvinylbutyral. According the present invention, the antenna element 1 is provided out of the driver's vision and more particularly in a hidden zone.

A connector 9 for a coaxial cable is used to make the transition between a coaxial cable 10 and the feeding structure.

In this particular case, the antenna structure 1 should be preferably located in face 4, also called P4, as the connector 9 cannot be laminated because of its thickness (too thick). The connector 9 should then be hidden behind plastic covers inside the car (A-pillar or central bracket).

Figure 2:
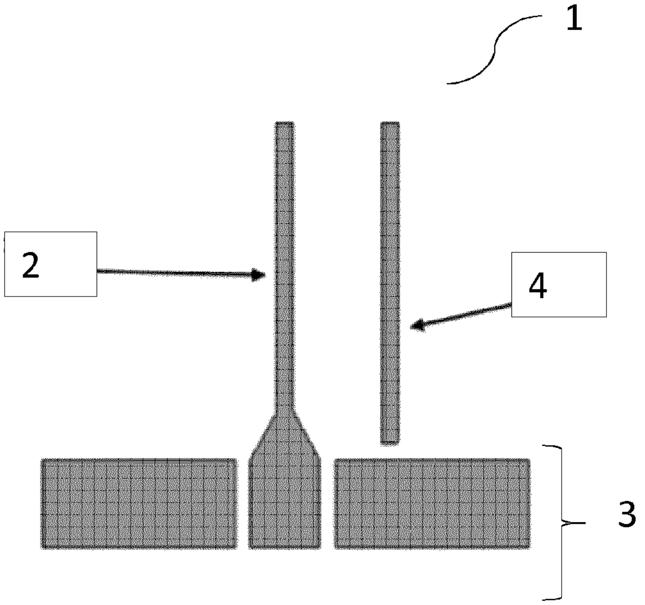

According to another embodiment of the present invention as shown in FIG. 2, a planar CPW-fed monopole 3 with parasitic element 4 may be used. At least one parasitic element 4 can be added close to the main radiating element 1, in order to shape the radiation pattern according to the application requirements. This at least one parasitic element 4 is electrically isolated from the main radiating element 2 (not connected to it). The at least one parasitic element 4 is made of conducting material, which can be the same or of another type than the main radiating element 2. It can be located in the same or in another layer of the glazing structure as the main element.

Figure 3:
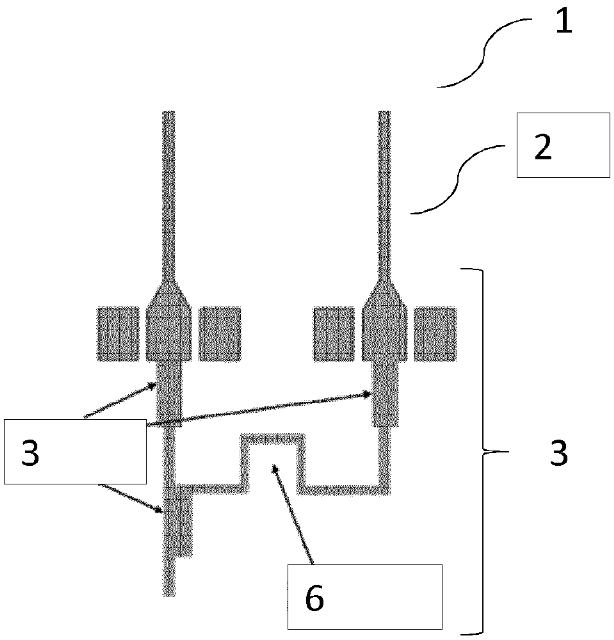

According to another embodiment of the present invention as shown in FIG. 3, an array of two radiating elements 2 is used to enable the possibility to shape the radiation pattern, by feeding them with different signal phases, and playing with the distance between the array elements.

For instance, an array, comprising two monopoles, similar to the one shown in FIG. 1, can be used. In this embodiment, the array elements can be fed through a microstrip transmission line, a CPW 3 or any planar transmission line or waveguide. One of the branches of the feeding structure can include a phase shifting branch 6 to tune the relative feeding phases between the elements. The feeding structure can also comprise impedance transformers to match the radiating elements' input impedance to the feeding line impedance 7 (e.g. quarter wave transformers).

Figure 4:
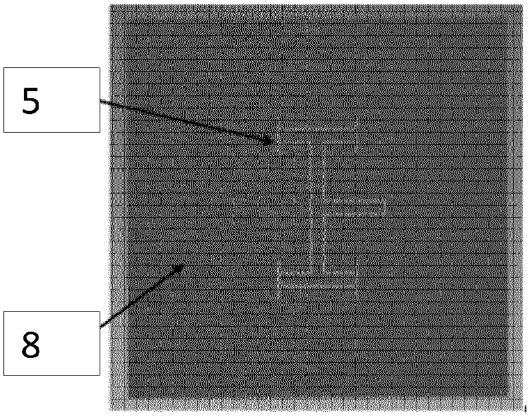

According to another embodiment of the present invention and as shown in FIG. 4, a slot antenna 5 may be used. In this example, the radiating element is made of conducting material 8 (either deposited on glass, or a thin wire dense mesh), in which slots are etched. The slots 5 can be used either as the main radiation source, or as impedance tuning elements. In the first case, the slots 5 can preferably be excited by electromagnetic coupling from a feeding structure located in another layer of the glazing structure. E.g. the slotted radiating element can be located in P2 or P3, while the feeding structure is located in P4, and connected to a connector making the transition from the feeding coaxial cable.

Figure 5:
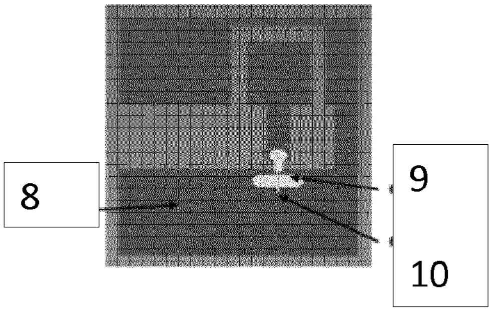

According to another embodiment of the present invention as shown in FIG. 5, a PIFA (Planar Inverted F Antenna or a Yagi antenna may be used. The PIFA antenna 1 may be used and the radiating element may made of conducting material 8. The radiating element 2 is connected to a power system through a connector 9 and coaxial feed line 10.

Thus antenna element 1 could be typically located in face 4 for a laminated glazing and excited by direct soldering of a connector. However, it could as well be integrated in face 2 or face 3 and be excited by electromagnetic coupling.

According to an embodiment of the present invention, a black enamel, commonly used to mask all not aesthetics elements like connectics, sensors . . . may be provided on face 2. It is understood that the enamel or any masking band may be provided in face 2 and/or face 3 and/or face 4.

This embodiment relates to a windshield 1, ie a laminated glazing, however, it could be transposed to a glazing made in one pane of glass like sidelite, backlite . . . .

The antenna element 2 according to the present invention is compatible with a heated glazing like a heated coated glazing or heated wired glazing. Both glazing are well-know and commonly used today, however, they may interfere with the efficiency of the antenna element.

The invention claimed is:

1. A vehicle antenna glazing comprising:

an antenna element wherein the antenna element is a WIFI antenna working at a 2.41-2.48 GHz frequency, the antenna element comprising an array of two planar radiating elements connected to a co-axial connector, each of the planar radiating elements being made of a monopole, and the two planar radiating elements being parallel to each other, wherein each of the two planar radiating element is fed with a different signal phase.

2. The glazing according to claim 1, wherein the antenna element is a wide band or multi-band WIFI antenna element working at a 2.41-2.48 GHz frequency.

3. The antenna element according to claim 2, wherein the antenna element is a wide band or multi-band WIFI antenna element working at a 5.1-5.8 GHz frequency.

4. The glazing according to claim 1, wherein the antenna element further comprises a planar feeding structure.

5. The glazing according to claim 1, wherein at least one of the planar radiating elements comprises a planar conducting material.

6. The glazing according to claim 5, wherein the planar conducting material is selected from the group consisting of a thin metal-based coating, a silver print, or a fine mesh of thin conducting wires.

7. The glazing according to claim 1, wherein at least one of the planar radiating elements comprises at least one slot etched in the planar conducting material.

8. The glazing according to claim 1, wherein at least one of the planar radiating elements is fed by electromagnetic coupling.

9. The glazing according claim 1, wherein the glazing comprises a laminated windshield having at least outer and inner panes of glass, the outer pane of glass having faces 1 and 2 and the inner pane of glass having faces 3 and 4, where face 2 is an inner face of the outer glass pane, face 3 is an inner face of the inner glass pane, and face 4 is an outer face of the inner glass pane of the windshield.

10. The glazing according to claim 9, wherein the antenna element is provided in face 2, face 3 or face 4.

11. The glazing according to claim 9, wherein the glazing is a heated, coated windshield.

12. The glazing according to claim 1, wherein at least one of the planar radiating elements comprises at least one parasitic element.

13. The glazing according to claim 12, wherein the at least one parasitic element is configured to shape a radiation pattern emitted by at least one of the planar radiating elements.

* * * * *